US008833986B2

(12) United States Patent
MacGregor

(10) Patent No.: US 8,833,986 B2
(45) Date of Patent: Sep. 16, 2014

(54) WORK LIGHT

(75) Inventor: Paul MacGregor, Madison, CT (US)

(73) Assignee: Mark 10 Industries, LLC, Madison, CT (US)

( * ) Notice: Subject to any disclaimer, the term of this patent is extended or adjusted under 35 U.S.C. 154(b) by 0 days.

(21) Appl. No.: 13/354,106

(22) Filed: Jan. 19, 2012

(65) Prior Publication Data

US 2012/0182749 A1 Jul. 19, 2012

Related U.S. Application Data

(60) Provisional application No. 61/434,101, filed on Jan. 19, 2011.

(51) Int. Cl.
*B60Q 1/00* (2006.01)
*B60Q 3/00* (2006.01)
*B60Q 3/06* (2006.01)
*F21L 14/02* (2006.01)

(52) U.S. Cl.
CPC ............ *B60Q 3/065* (2013.01); *F12V 21/0885* (2013.01); *F21L 14/02* (2013.01)
USPC ............ 362/486; 362/496; 362/457; 362/220

(58) Field of Classification Search
USPC ......... 362/486, 487, 496, 504, 509, 549, 459, 362/217.01, 368, 220, 396, 217.1, 221
See application file for complete search history.

(56) References Cited

U.S. PATENT DOCUMENTS

| 3,691,366 | A | * | 9/1972 | Spreuer | 362/253 |
| 4,197,573 | A | * | 4/1980 | Thatch | 362/241 |
| 6,799,863 | B2 | | 10/2004 | Offiler et al. | |
| 7,547,126 | B2 | * | 6/2009 | Hiratsuka | 362/413 |
| 8,231,241 | B2 | * | 7/2012 | Hopkins | 362/217.16 |
| 2008/0117644 | A1 | * | 5/2008 | Li | 362/496 |
| 2008/0239730 | A1 | * | 10/2008 | Chien | 362/368 |

OTHER PUBLICATIONS

National Electric® 13 Watt X-Light Yellow Work Light with 25 Foot Cord; Product details, description and specifications from Amazon. com; http://www.amazon.com/National-Electric-NAT10025-X-Light-Yellow/dp/B000JD1EI0/ref=sr_1_1? ie=UTF8 &qid=1327331785&sr=8-1; prior to Jan. 2011; 1 page.
Central Lighting—Specialty Lights and Accessories; Product details/specification; http://www.centraltools.com/lights_special. html; Copyright 2011 Central Tools, Inc. 1 page.

\* cited by examiner

*Primary Examiner* — Jason Moon Han
*Assistant Examiner* — Jessica M Apenteng
(74) *Attorney, Agent, or Firm* — St. Onge Steward Johnston & Reens LLC

(57) ABSTRACT

A lighting assembly for illuminating a work area, such as the area underneath the hood of a vehicle or the area underneath the body of a vehicle. The lighting assembly has a light, support rod having an adjustable length and two clasping members, the two clasping members being able to attach the lighting assembly to the hood or body of a vehicle.

22 Claims, 15 Drawing Sheets

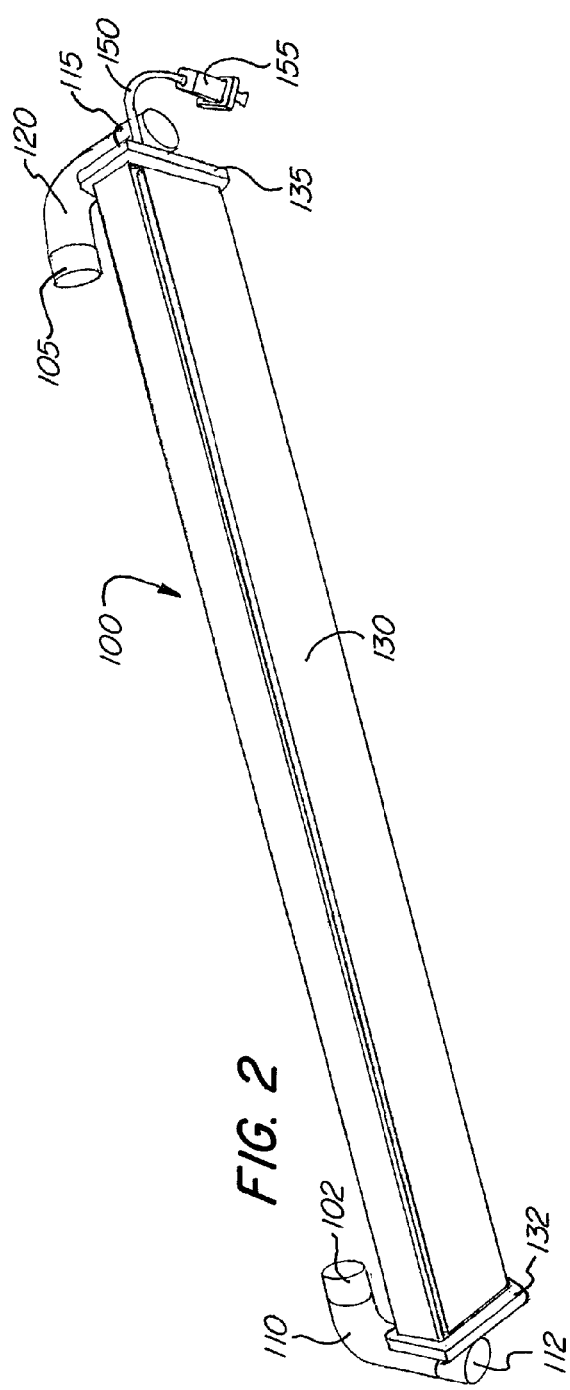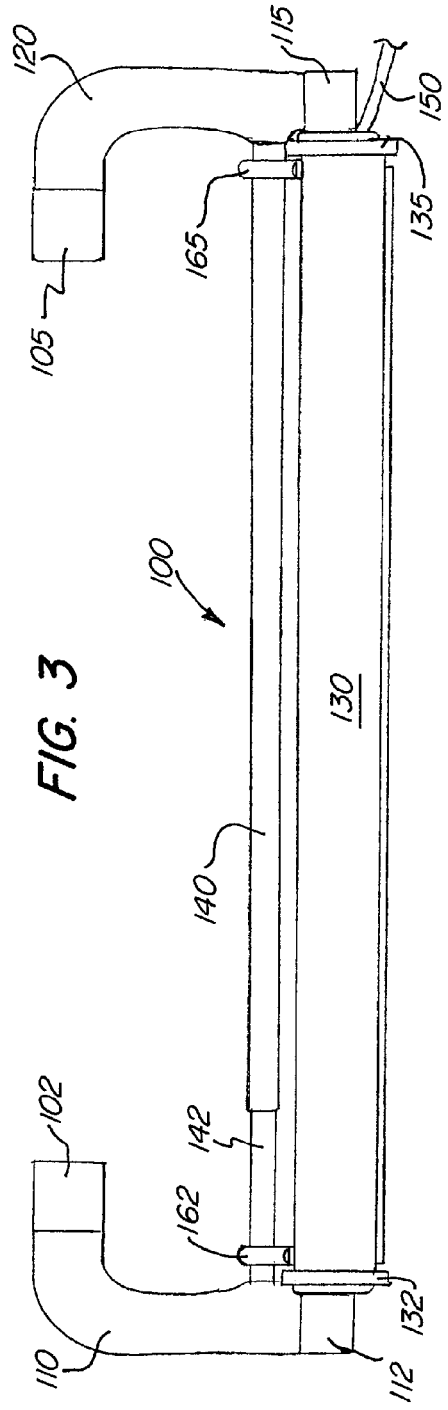

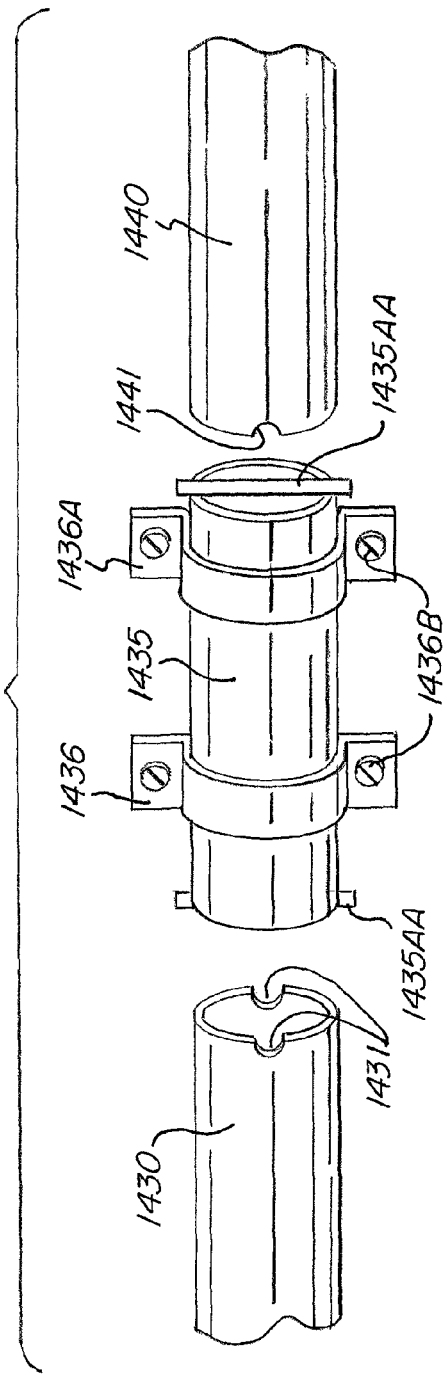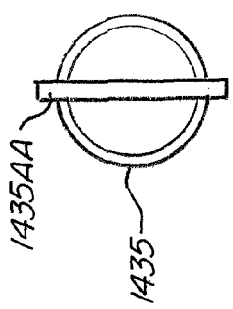
FIG. 18
FIG. 19

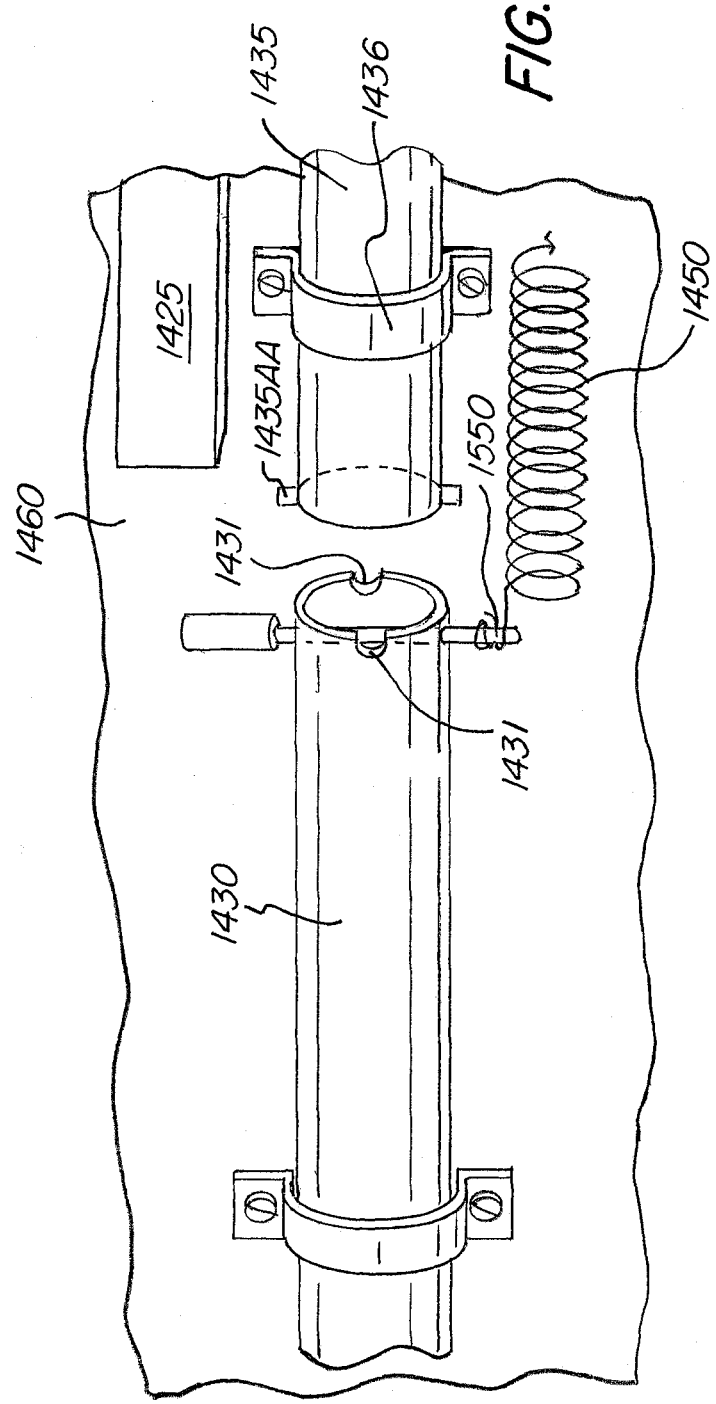

WORK LIGHT

CROSS-REFERENCE TO RELATED APPLICATIONS

The present application claims the benefit under 35 U.S.C. §119(e) of the U.S. Provisional Patent Application Ser. No. 61/434,101, filed on Jan. 19, 2011, entitled "Work Light".

FIELD OF THE INVENTION

A lighting system and assembly for illuminating a space, such as the area underneath the hood of a vehicle, or an area underneath the body of a vehicle.

BACKGROUND OF THE INVENTION

In the automobile industry, lights and lighting assemblies are used by mechanics and engineers to illuminate an area underneath the hood of a vehicle or under the body of a vehicle, so that a mechanic has proper lighting to fix and repair the vehicle. Existing lighting assemblies, however, suffer from deficiencies, as typical existing assemblies do not conveniently attach to the underneath portion of a vehicle or to a vehicle hood and require a mechanic or additional person, such as an assistant, to hold the light, thus, diminishing the available hands to work to fix and repair the vehicle.

Typical prior art assemblies for work lights are hand-held, such as the National Electric® 13 Watt X-Light Yellow Work Light with 25 Foot Cord or the Coleman® Cable Fluorescent Work Light with 25 Foot Cord. These hand-held lighting systems are available at typical hardware stores such as Sears® and do not attach to the hood or the body of a vehicle. Thus, these hand-held lighting assemblies must be held in place by a mechanic fixing the vehicle or the mechanic's assistant in order to shine light to illuminate a work area.

Hand-held lighting assemblies also suffer from additional deficiencies as these assemblies shine a bright light into the eyes of a mechanic, thus, providing a direct light source that overpowers the eyes of a mechanic, and may interfere with a mechanic's work.

Other such assemblies, such as the Underhood Lite® with LitePerch® provided by Central Tools Inc® of Cranston, R.I., can attach to the hood or body of an automobile. This assembly, however, suffers from other deficiencies as it, while able to attach to the underneath portion of an automobile hood, is flimsy and difficult to attach. Moreover, this system has a long cord, which can become tangled or can get in the way of a mechanic's work.

The Underhood Lite® also suffers from having its light required to be rotated, as it does not provide a light source having sufficient lumens to illuminate the entire body of an engine. Thus, rather than being a self-leveling light, the Underhood Lite® must constantly be rotated in order to illuminate a specific work area. Further, the Underhood Lite® does not have a notch or groove to lock its clasping members and will rotate upon its longitudinal axis, thus, being flimsy and unworkable. Additionally, the Underhood Lite® further suffers from being flimsy as if it is bumped by a mechanic doing work, it may fall off and lose its attachment to the hood or body of a vehicle.

Other deficiencies of systems such as the Underhood Lite® are that they have a light that creates shadows, thus, making it difficult for a mechanic to work on a specific area, overpowering the mechanic's eyes when the mechanic looks directly into the light and creating a light source that is not beneficial for mechanical work.

Other deficiencies of existing systems include giving off excessive heat, lacking durability, and having a high cost.

Thus, it is desired to provide a lighting assembly and method for providing a lighting assembly that can attach to the hood or body of a vehicle, and can illuminate an area underneath the hood or body of a vehicle, so that a mechanic can work and see the illuminated area, while overcoming the deficiencies of the existing assemblies.

SUMMARY OF THE INVENTION

Thus, it is an object of the present invention to provide a lighting assembly and method for providing a lighting assembly that can attach to the hood or body of a vehicle, and can illuminate an area underneath the hood or body of a vehicle, so that a mechanic can work and see the illuminated area.

It is a further object of the invention to overcome the deficiencies of existing lighting assemblies and provide a lighting system that does not cast shadows.

It is a further object of the invention to provide a lighting assembly that uses bulbs that emit a low level of heat.

It is a further object of the invention to illuminate an entire engine compartment and eliminate the need for a droplight, allowing a mechanic to have both of his or her hands free, and saves time, as the mechanic will not have to move and/or readjust the light every few minutes.

These and other objects of the invention are achieved by providing a lighting assembly that does not cast shadows and attaches to the hood or body of a vehicle such as an automobile, truck or other such vehicle for transportation that requires maintenance.

These and other objects of the invention are achieved by providing a lighting assembly comprising: a housing having a light source within the housing; a first support rod; a second support rod, the second support rod being located partially within the first support rod, wherein the second support rod and the first support rod are each attached to the light housing via one or more brackets; and two clasping members, one of the clasping members attached to an end of the first support rod and the other clasping member attached to an end of the second support rod, wherein the two clasping members attach the lighting assembly to a hood or body of a vehicle, and wherein the lighting assembly is self-leveling.

The lighting assembly further may comprise a biasing member, the biasing member extending through the first support rod and the second support rod. The biasing member may have a hook at each of its ends.

In other embodiments, the biasing member may have a hook at only one of its ends. In other embodiments, the biasing member may have a nut and bolt assembly at each of its ends and be threaded.

The biasing member may comprise a spring and an extension member, the spring being able to adjust its length and the extension member being fixed in length. Each hook at each of the ends of the biasing member and the extension member may attach to one of the two clasping members.

The biasing member may comprise solely a spring, the spring being able to adjust its length and the extension member being fixed in length. Each hook at each of the ends of the spring may attach to one of the two clasping members.

In some embodiments, the first clasping member has an internal first clasping member and an external first clasping member, and the second clasping member has an internal second clasping member and an external second clasping member, wherein the internal first clasping member is located within the external first clasping member and the internal second clasping member is located with the external second clasping member.

The hooks at the ends of the biasing member may attach to the internal first clasping member and the internal second clasping member, the internal first clasping member and the internal second clasping member fitting within the inner portion of the hooks. This may provide a secure fit between the hooks and the internal first and the internal second clasping members. Such an arrangement provides increased strength to the lighting assembly.

The lighting assembly may further comprise two end members, the first end member being attached to an end of the first support rod and the second end member being attached to the end of the second support rod, wherein the first end member attaches to the internal first clasping member and the second end member attaches to the internal second clasping member via fasteners. Fasteners may include screws and/or a nut and bolt assembly.

In certain embodiments, the first support rod may have a groove or notch and the second support rod may have a fastener inserted within the second support rod in a hole, wherein when the fastener located within the second support rod is inserted within the groove or notch located in the first support rod. Such an arrangement connects the clasping members so that the two clasping members rotate in unison when one clasping member is rotated. This also helps the lighting assembly be self-leveling and allows for easier application of the light assembly to the hood, as once the first clasping member attaches to the hood, it is easier to attach the second clasping member.

In other embodiments, the second support rod may have a groove or notch and the first support rod may have a fastener inserted within the first support rod, wherein when the fastener located within the first support rod is inserted within the groove or notch located in the second support rod, the two clasping members rotate in unison.

The lighting assembly may include a mirror within the housing. The mirror may extend throughout the length and/or the width of the housing. The mirror allows for the assembly to create a shadowless light.

In some embodiments, the lighting assembly housing is made from strong polymer materials. The light source of the lighting assembly may include one or more fluorescent bulbs.

Other objectives of the invention are achieved by providing a lighting assembly comprising: a housing having a light source within the housing; a first support rod; a second support rod, the second support rod being located partially within the first support rod, wherein the second support rod and the first support rod are attached to the light housing; a biasing member, the biasing member extending through the first support rod, wherein the biasing member has a hook at each of its ends; a threaded extension element, the threaded extension element extending through the second support rod; and two clasping members, one of the clasping members attached to an end of the second support rod and the other clasping member attached to an end of the first support rod, wherein the two clasping members attach the lighting assembly to a hood or body of a vehicle.

The lighting assembly may be self-leveling in various embodiments. The second support rod and the first support rod may be each attached to the light housing via one or more brackets in certain embodiments.

The lighting assembly may have the hook at one end of the biasing member attach to one of the two clasping members and the other hook attach to a coupler assembly located at one end of the threaded extension element. The threaded extension element may attach to the other one of the two clasping members via a nut and washer assembly.

In other embodiments, the spring may be threaded at one end and may be attached to the other one of the two clasping members via a nut and washer assembly.

In certain embodiments, the first support rod may have a groove/notch and the second support rod has a fastener inserted within the second support rod, wherein when the fastener located within the second support rod is inserted within the groove/notch located in the first support rod, the two clasping members rotate in unison. This allows for easier mounting of the assembly on the hood of a vehicle and helps keeps the assembly self-leveling.

The light housing may include a mirror. The mirror may extend throughout the length and width of the housing.

Other objectives of the invention are achieved by providing a lighting assembly comprising: a housing having a light source within the housing; a first rod located within the housing, the first rod having two ends; a second rod located within the housing, the second rod having two ends, wherein the second rod and the first rod are each attached to the light housing via one or more brackets; a biasing member, one end of the biasing member connected to one end of the first rod and the other end of the biasing member connected to one end of the second rod; two clasping members, one of the clasping members attached to the other end of the first rod and the other clasping member attached to the other end of the second rod, wherein the two clasping members attach the lighting assembly to a hood or body of a vehicle.

In some embodiments, the lighting assembly may be self-leveling. In some embodiments, the biasing member may be a spring.

The biasing member may be under tension to urge the clasping members towards each other. When one of the clasping members is pulled manually away from the other, the rod attached to the clasping member will slide and the biasing member will oppose such a sliding movement.

The biasing member may have a hook at each of its ends, the hook at each of its ends being connected to one end of the first rod and to one end of the second rod via one or more fasteners.

The lighting assembly may further comprise an extended fastener located where the biasing member connects to one end of the first rod, the extended fastener keeping the first rod from rotating around its horizontal axis.

The lighting assembly may further comprise an extended fastener located where the biasing member connects to one end of the second rod, the extended fastener keeping the second rod from rotating around its horizontal axis.

The lighting assembly may further have at least one of the two clasping members have a rough surface area, the rough surface area preventing the lighting assembly from sliding off a hood or a body of a vehicle when the lighting assembly is mounted on the hood or the body of a vehicle.

The housing may further include a mirror, the mirror extending along the entire length and/or width of the housing. The mirror may also be shorter than the length and/or width of the housing in certain embodiments.

The housing may include shock absorbers to hold the light source within the housing, the shock absorbers preventing the light source from breaking if the housing is dropped. The shock absorbers also keep the light source in place. The shock absorbers may be located throughout the housing, but are preferably located in the sockets of the lights.

The housing may further include heat resistant tape or high temperature safety disks for securing the light source to sockets if the light assembly is dropped.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 2 is a perspective view of the lighting assembly of FIG. 1;

FIG. 3 is a side view of the lighting assembly of FIG. 1;

FIG. 18 is an internal view of the lighting assembly of FIG. 13 of another embodiment of the invention;

FIG. 19 is an cross section view of a portion of FIG. 18; and

FIG. 20 is an exploded view of a subsection of the lighting assembly of FIG. 18.

DETAILED DESCRIPTION OF THE INVENTION

Figure 1:
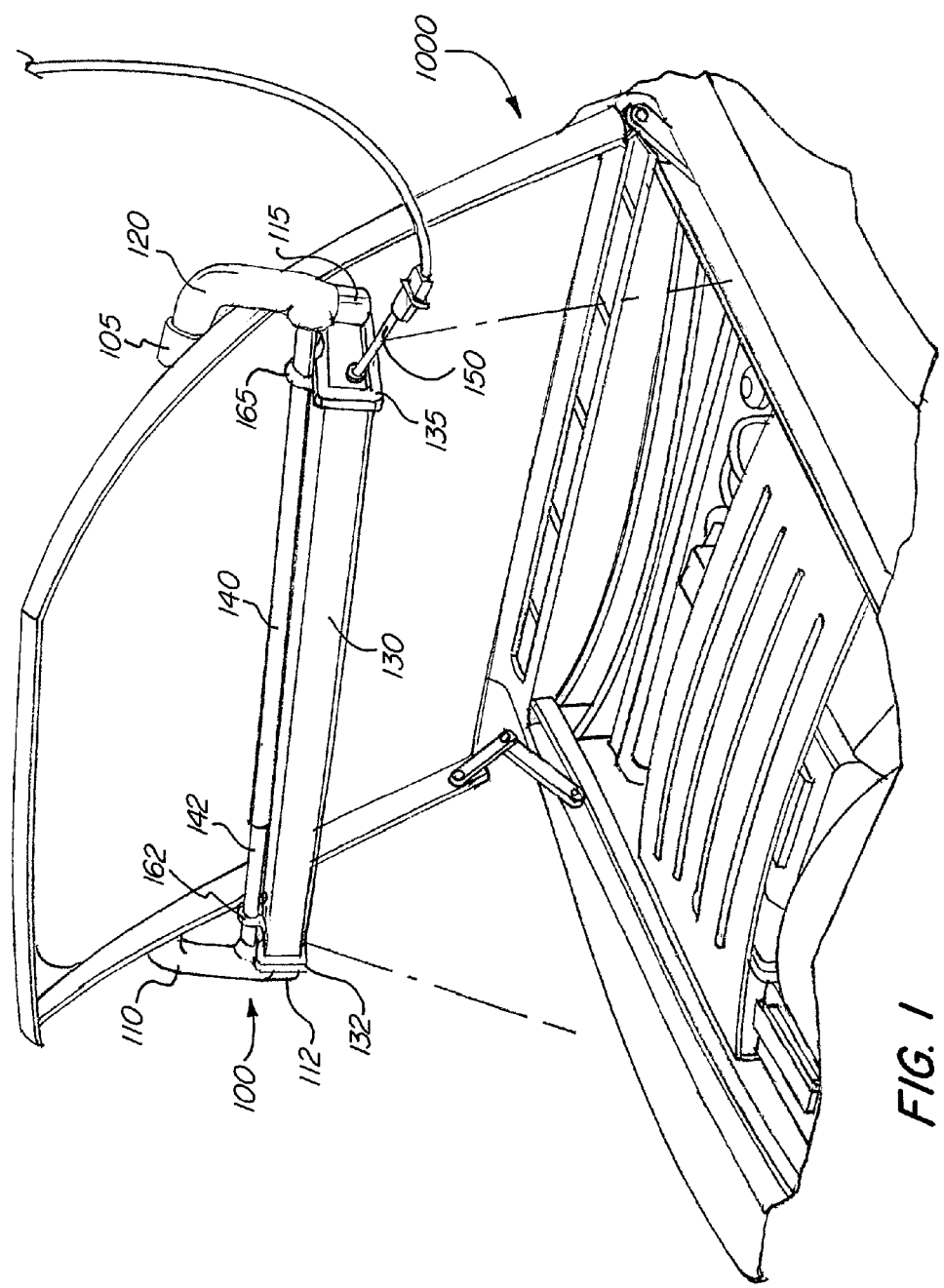
FIG. 1 is a perspective view of one embodiment of the lighting assembly attached to the underneath portion of a hood of an automobile.
Figure 4:
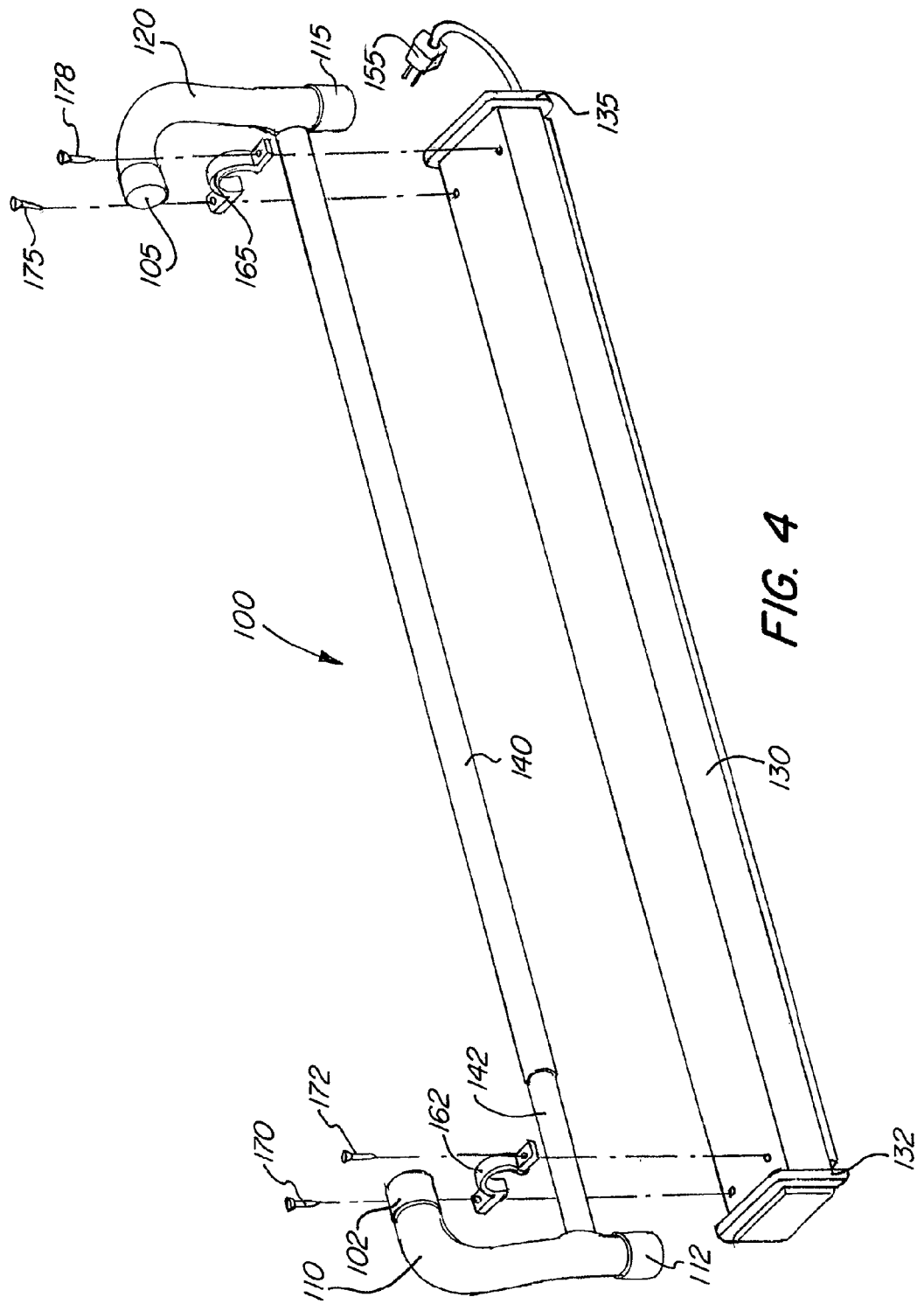
FIG. 4 is an exploded view of the lighting assembly of FIG. 1.

Objects of the invention are directed to providing a lighting assembly that does not cast shadows and attaches to the hood or body of a vehicle such as an automobile, truck or other such vehicle for transportation that requires maintenance.

In some embodiments of the invention, the lighting assembly uses mirror technology to bend the light so that it literally wraps around objects and creates a "shadow less" light. This involves a lighting assembly having an outer reflector having multiple mirrors, so that the light cast from the mirrors does not cast shadows.

In some embodiments, the lighting assembly uses fluorescent bulbs that do not produce heat and can be replaced cheaply and with ease at most hardware stores. In some embodiments, the lighting assembly is provided with a special ballast, and fluorescent bulbs that will not produce heat or will produce minimal amounts of heat. In preferred embodiments, after running for hours, the bulbs and ballast will only reach 100° F.-110° F.

In some embodiments, the fluorescent bulbs have their own shock absorbers and "adhesive disks" that prevent the bulbs from falling out or breaking should the light be dropped.

In some embodiments, the light has hooks (clasping members) that allow it to attach to the hood or body of a vehicle. The hooks are attached to a spring-loaded mechanism, whereby hooks exert a force on the hood or body of the vehicle, holding the assembly in place.

In some embodiments, the invention may provide hook assembly rods (stability rods), such rods being attached to the end hooks. These rods may be used to enclose a spring-loaded mechanism that allows the hooks to move in opposing directions. In some embodiments, the hook assembly can be moved in unison with or independently from its other side.

The spring-loaded mechanism may be either internal and/or external to the hook assembly rods. Other embodiments use other mechanisms to allow the hooks to move in opposing directions and thus allow the assembly to be adapted to hoods or vehicle bodies of various widths. The assembly may fit nearly any hood from 50 to 70 inches wide.

In some embodiments the spring-loaded mechanism is attached to the internal stability rod. In some embodiments the spring-loaded mechanism may be attached to the clasping members.

In some embodiments, the assembly is made of a metal shell. In other embodiments, materials used may be aluminum, titanium, and other such materials that are strong, but yet lightweight. In some embodiments, the assembly is made of polymers or hard plastic.

In some embodiments, the lighting assembly has a short cord that allows for ease (and safety) of use. In some embodiments, the lighting assembly is provided with a GFCI (Ground Fault Circuit Interrupter) extension cord as a safety measure. In the event of an accident, the GFCI extension cord will trip the electrical circuit, cutting the power to the cord and the light assembly. In this way, some embodiments prevent accidents from occurring.

In some embodiments, the lighting assembly may produce 6,000 lumens, nearly 3 times the light output created by most of the existing work lights on the market. This may provide sufficient light to illuminate a work area, such as the engine of an automobile or other such vehicle.

In some embodiments, the lighting assembly is self-leveling and has a built in shield that ensures that the light only shines where you need it. The built in shield may help provide a light that casts no shadows.

In some embodiments, the lighting assembly may light up an entire engine compartment of a vehicle and may eliminate the need for a droplight. This may leave both of the hands of a mechanic free to work and saves time, as the lighting assembly provides the advantage of not having to move or readjust the lighting.

In some embodiments, the lighting assembly may have its support rods be internal to the housing. In some embodiments, the lighting assembly may include fasteners and/or notches to keep the clasping members in interaction with one another for easy mounting of the assembly to the hood of a vehicle.

Referring to FIG. 1, an assembled lighting assembly 100 of an embodiment of the invention is shown attached to the hood of a car 1000. Lighting assembly 100 is shown such that lighting assembly 100 may provide one or more lights within a light housing 130 to illuminate a work area when the light is turned on.

More specifically, the lighting assembly 100 is made of various elements. As shown in FIGS. 1-4, lighting assembly 100 has light housing 130 enclosing a light source, which is attached to stability rod 140 via brackets 162, 165. Brackets 162/165 are held in place via screws 170, 172, 175, and 178. Other such supporting members may be used other than brackets 162, 165 in order to attach the light 100 to the stability rod 140. The brackets 162/165 keep the light self leveling. The weight of the light housing 130 which is permanently secured to the brackets keeps the light housing 130 self-leveling and thus keeps the light source level.

The assembly has stability rod 140 attached to clasping members 110, 120. Internal stability rod 142 is also shown, the internal stability rod having a smaller diameter that the stability rod 140 and fitting partially within stability rod 140. The internal stability rod is attached to clasping member 110, while the stability rod 140 (also called the external stability rod) is attached to the other clasping member 120. Clasping members 110, 120 are used to attach the assembly 100 to the hood or body of a vehicle 1000. The clasping members 110, 120 have end caps 102, 112 and 105, 115 attached to these members, respectively. These end caps may be made of rubber to allow for the ends of the clasping members to be smooth, so that the hood of a vehicle is not scratched. The end caps 102, 112, 105 and 115 may be made of various materials. It is preferable that the materials are flexible and durable. It is also preferable that the materials of the caps do not allow the assembly to slide off the hood.

The assembly also has power cord 150 that attaches to the light 130. Power cord 150 provides power to light assembly 100 and is typically a short cord, so that the cord does not get in the way and interfere with a mechanic's work. Plug 155 is shown so that the power cord 150 may receive power from a conventional wall outlet.

The light of the assembly 100 is made of light housing 130 and ends 132 and 135. The light housing 130 has a mirror or multiple mirrors so that it may cast a light with no shadows. The light housing 130 may have one or more florescent bulbs located within the light housing 130. The light housing is held together via the ends 132 and 135. The ends keep the light housing 130 together and offer support for the one or more florescent bulbs located within the light housing 130. In other embodiments the light housing 130 is held together without requiring the support of ends 132 and 135.

Figure 5:
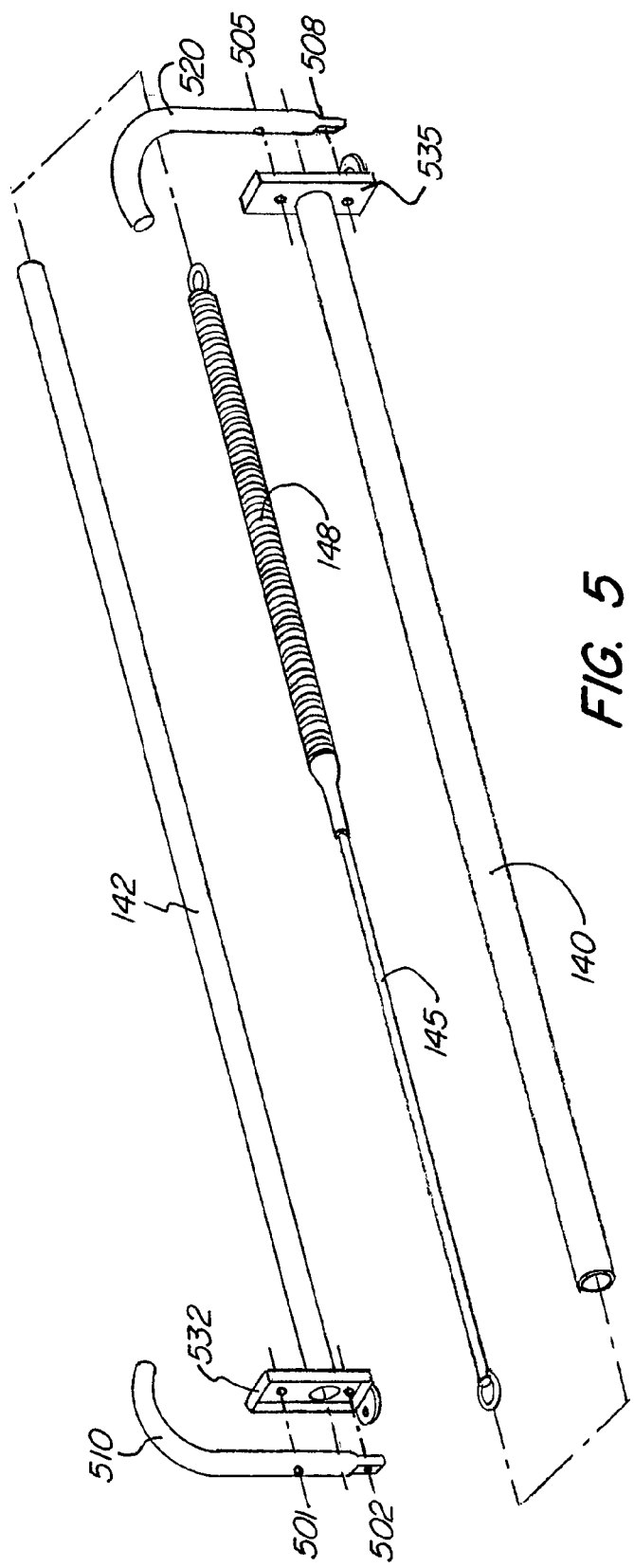
FIG. 5 is an exploded view of the internal assembly of the lighting assembly of FIG. 1.

FIG. 5 shows the internal workings of lighting assembly 100 in an exploded view. In FIG. 5, internal stability rod 142 is shown attached to internal end member 532 which is attached to internal clasping member 510. Holes 501 and 502 are shown through which screws may be inserted to attach internal stability rod 142 to internal end member 532 and internal clasping member 510.

External stability rod 140 is shown attached to internal end member 535 which is attached to internal clasping member 520 via screws that may be inserted through holes 505 and 508. Moreover, spring member 148 with extension 145 is shown also shown in FIG. 5. Spring member 148 with extension 145 has hooks on its ends that may allow for attachment of the spring member 148 and extension 145 to the internal clasping members 510 and 520. In other embodiments, the spring member 148 may be made of various materials and may have alternative constructions than the spring member shown. The spring member 148 is used to expand and contract and offers a force that holds the assembly 100 together, such that it may be attached to the body or hood of a vehicle.

The assembly as shown may expand and contract as the spring member 148 is used to hold the assembly together. However, mechanical force may be used to separate the distance between clasping members 510 and 520, so that the assembly can attach to various widths of hood or bodies of vehicles.

Figure 6:
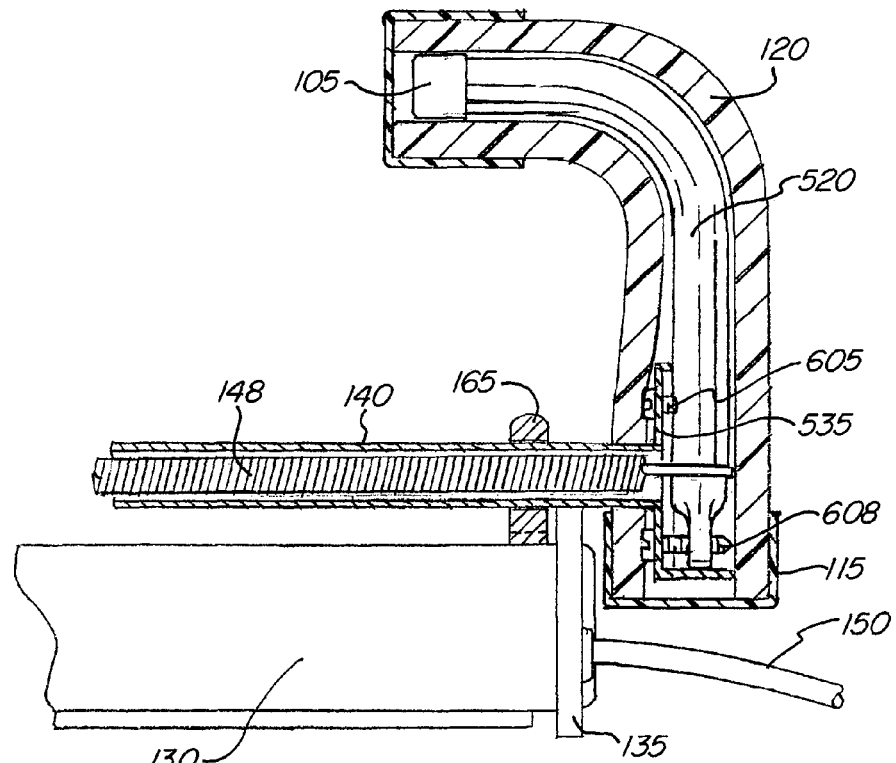
FIG. 6 is a cross section view of an exploded area of the lighting assembly of FIG. 1.

Shown in FIG. 6 is a cross sectional view of the attachment of the spring member 148 to the clasping member 520. Here, spring member 148 is shown having its hook attached to internal clasping member 520. The hook completely surrounds internal clasping member 520, attaching the spring to the clasping member to provide a secure fit. Furthermore, screws 605 and 608 are shown attaching the internal end member 535 to the internal clasping member 520. FIG. 6 also shows the assembly having the external clasping member as well as end caps 105, 115. The assembly is constructed and the other end of the assembly is attached similarly, whereby internal end member 532 is attached to internal clasping member 510 (not shown). Also the extension of spring member 145 is attached to internal clasping member 510 in similar fashion to the spring member.

Figure 7:
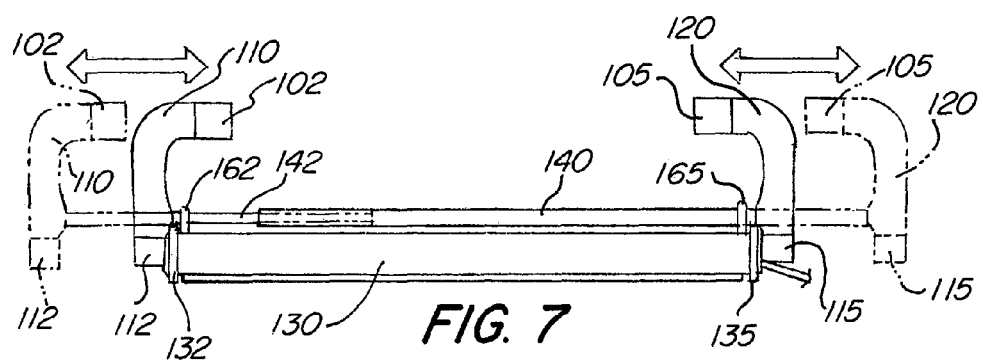
FIG. 7 is a perspective view of the light of FIG. 1 that shows how the lighting assembly can expand and contract.

FIG. 7 is shown to demonstrate how the lighting assembly 100 may expand and contract. Here, the clasping members 110 and 120 may be separated by using mechanical force, so that the distance between clasping members 110 and 120 may be increased. This allows the lighting assembly 100 to attach to various widths of hood or bodies of vehicles. The expansion of the distance between clasping members 110 and 120 is shown in broken line form.

Figure 8:
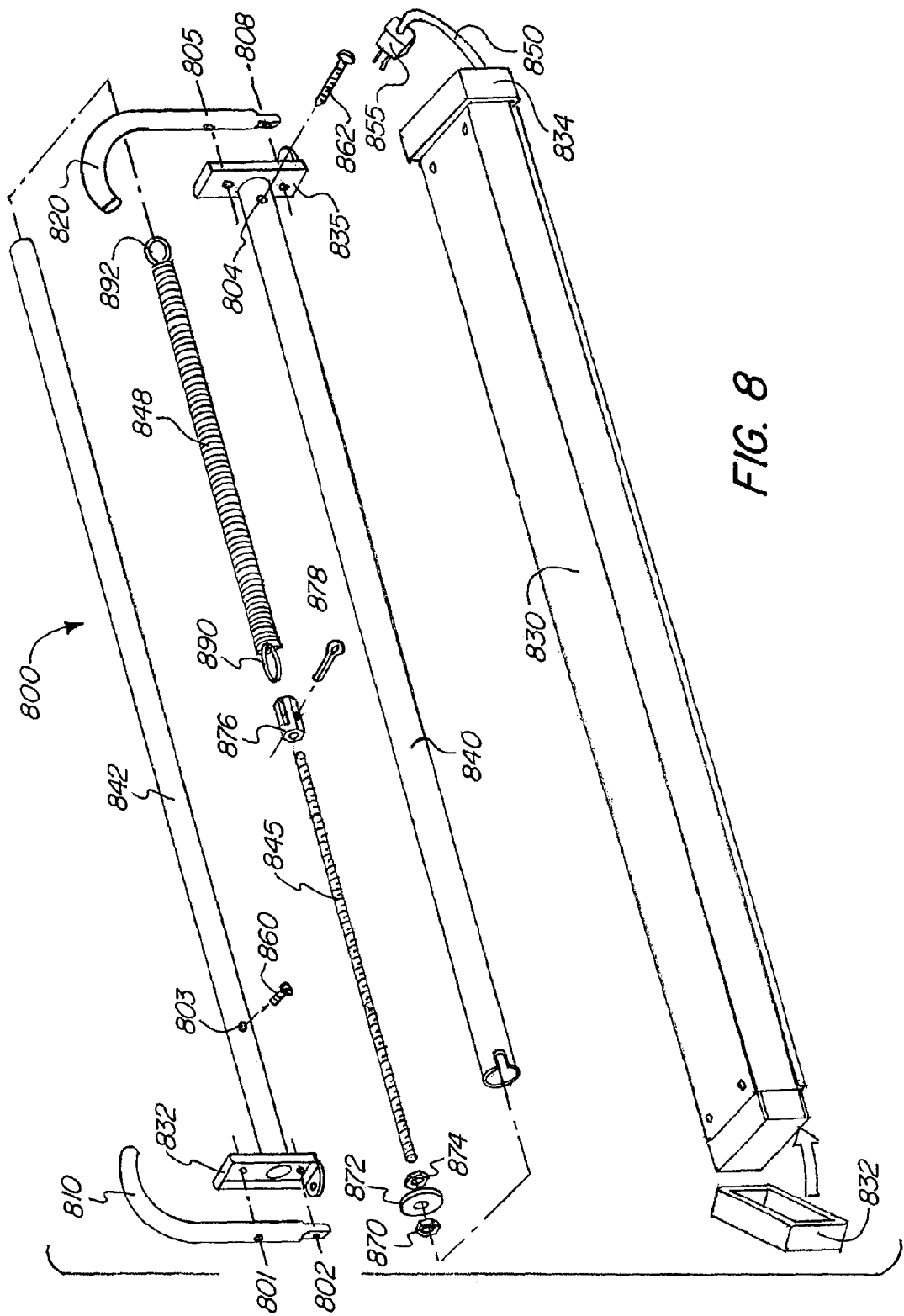
FIG. 8 is an exploded view of the internal assembly of a lighting assembly of an embodiment of the present invention.

FIG. 8 shows the internal workings of another embodiment of the invention. Here, light assembly 800 is shown in an exploded view. In FIG. 8, internal stability rod 842 is shown attached to internal end member 832 which is attached to internal clasping member 810. Holes 801 and 802 are shown through which screws may be inserted to attach internal stability rod 842 to internal end member 832 and internal clasping member 810.

External stability rod 840 is shown attached to internal end member 835 which is attached to internal clasping member 820 through screws that may be inserted through holes 805 and 808. Moreover, spring member 848 with extension 845 is shown. Spring member 848 with extension 845 has a hook 892 on its end. Screw 862 which goes through hole 804 in external stability rod 840 is projected through ring 892, holding the ring 892 in place and thus holding spring member 848 in place. The screw 862 attaches the spring member 848 internally to the external stability rod 840.

On the other end of spring member 848 is another ring member 890. Ring 890 is attached to coupler assembly 876, which is attached to extension 845. Extension 845 may be threaded in some embodiments.

In this construction, ring 890 fits into coupler 876. Pin 878 is used to hold the ring 890 and connect this piece to the coupler 876. The coupler 876 is attached to threaded extension 845. In some embodiments, the coupler 876 is internally threaded so that it corresponds to the threads of threaded extension 845.

Figure 10:
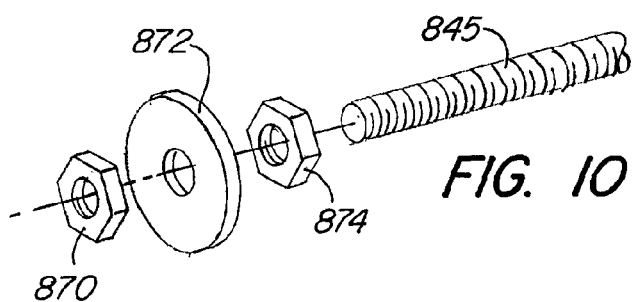
FIG. 10 is an exploded view of a subsection of the lighting assembly of FIG. 8.
Figure 11:
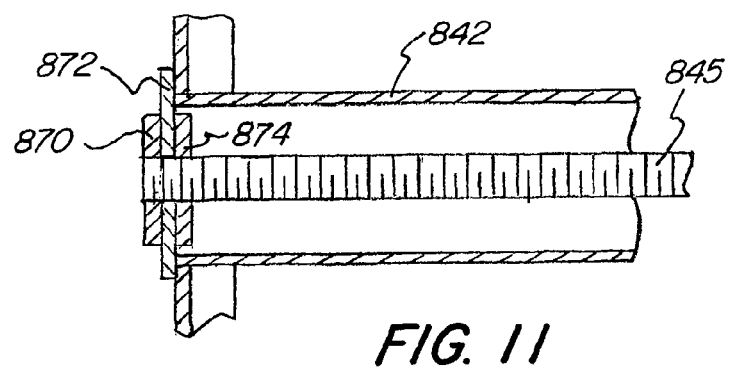
FIG. 11 is a cross section view of a subsection of the lighting assembly of FIG. 8.

On the other end of threaded extension 845, a double nut and washer assembly is shown. This nut-washer-nut assembly, shown as elements 870, 872 and 874, respectively, is used to attach the threaded extension 845 to internal stability rod 842. This is further shown in the cross-section view of FIG. 11, which is a cross-section view of the nut-washer-nut assembly. The washer 872 has a larger diameter than the diameter of the internal stability rod 842. The nut-washer-nut assembly attaches the threaded extension 845 to the internal stability rod 842, and the larger diameter of the washer 872 stabilizes the threaded extension 845 against the end of the internal stability rod 842. Furthermore, FIG. 10 shows a perspective view of the nut-washer-nut assembly 870, 872, 874, whereby this nut-washer-nut assembly can attach to threaded extension 845. The nuts 870 and 874 are shown corresponding to the threads of threaded extension 845.

FIG. 8 also provides that the light housing 830 has end caps 832 and 834. These end caps may be made of rubber, silicon, or vinyl, or other material that is flexible. The end caps 832 and 834 may have holes through the caps, preferably off to the side of the caps, to allow for the extension cord 850 to pass through the cap. The extension cord 850 has plug 855 at the end of it.

In another embodiment, end caps 832 and 834 are also able to be easily slid off the light housing 830. This then allows fluorescent bulbs located within the light housing 830 to be easily removed. This also allows the lens located within the light housing 830 to be easily removed. The end caps 832 and 834, while able to be slid off light housing 830, however, fit snug against the light housing 830.

Figure 9A:
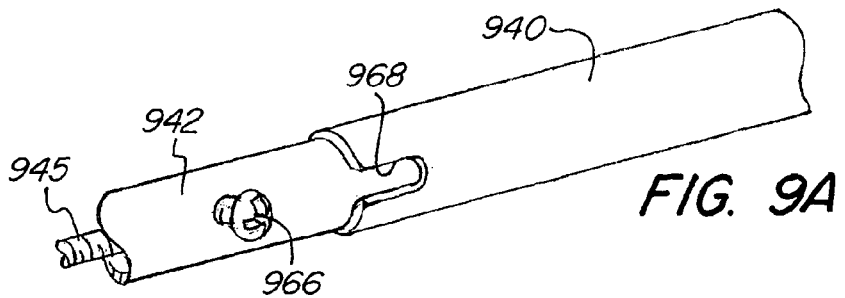
FIG. 9A is a perspective view of an embodiment of the present invention.
Figure 9B:
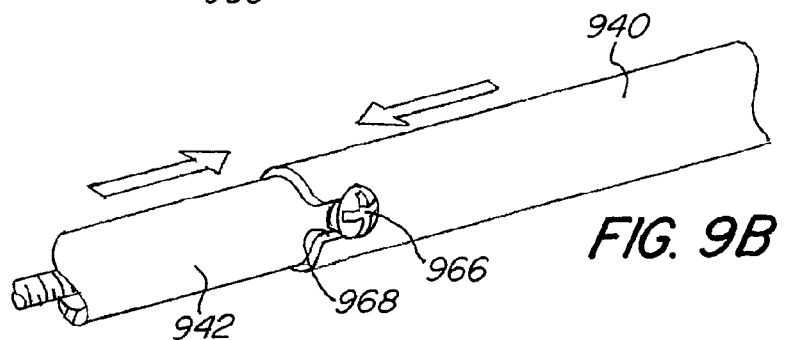
FIG. 9B is a perspective view of the embodiment of FIG. 9A.

FIG. 8 also provides for hole 803 located within the body of the housing. Here, screw 860 may be inserted within hole 803, and this then holds the internal stability rod 842 and the external stability rod 840 together, thus preventing the rods from rotating around their horizontal axis. FIGS. 9A and 9B show a detailed view of this feature of the invention.

In FIGS. 9A-9B, internal stability rod 942 is shown located within external stability rod 940. Threaded extension 945 is located with internal stability rod 942. Furthermore, screw 966 is show plugging hole 803 in internal stability rod 942.

FIG. 9A shows groove or indentation 968 in the external stability rod 840 where screw 966 can hold internal stability rod 942 to external stability rod 940, preventing the stability rods from rotating around their axis. The screw 966 may be a flat head screw or Phillips screw. All screws used in the invention may be a flat head screw or Phillips screw.

The groove or indentation 968 allows for locking the two clasping members 810 and 820 together, such that a mechanic or user of the invention may control the opposite clasping member at the other end of the stability rod by controlling the other clasping member.

A user may attach one clasping member to the hood of a vehicle. Upon doing so, the user is then able to control the other clasping member via the screw 966 and groove 968 assembly, such that the user may lock the clasping members together so that the clasping members together may be rotated in unison. The screw 966 and groove 968 assembly allows for the screw 966 to drop into groove 968 to allow the clasping members to be rotated in unison.

This offers advantages over existing systems, as existing systems do not allow for the clasping members to be rotated in unison. Instead, in existing systems, the clasping members often flip and once a mechanic attached one clasping member to the hood of a vehicle, it is often to attach the other clasping member to the other end of the hood, as this clasping member in existing systems will flip and not be in correct alignment.

Figure 12:
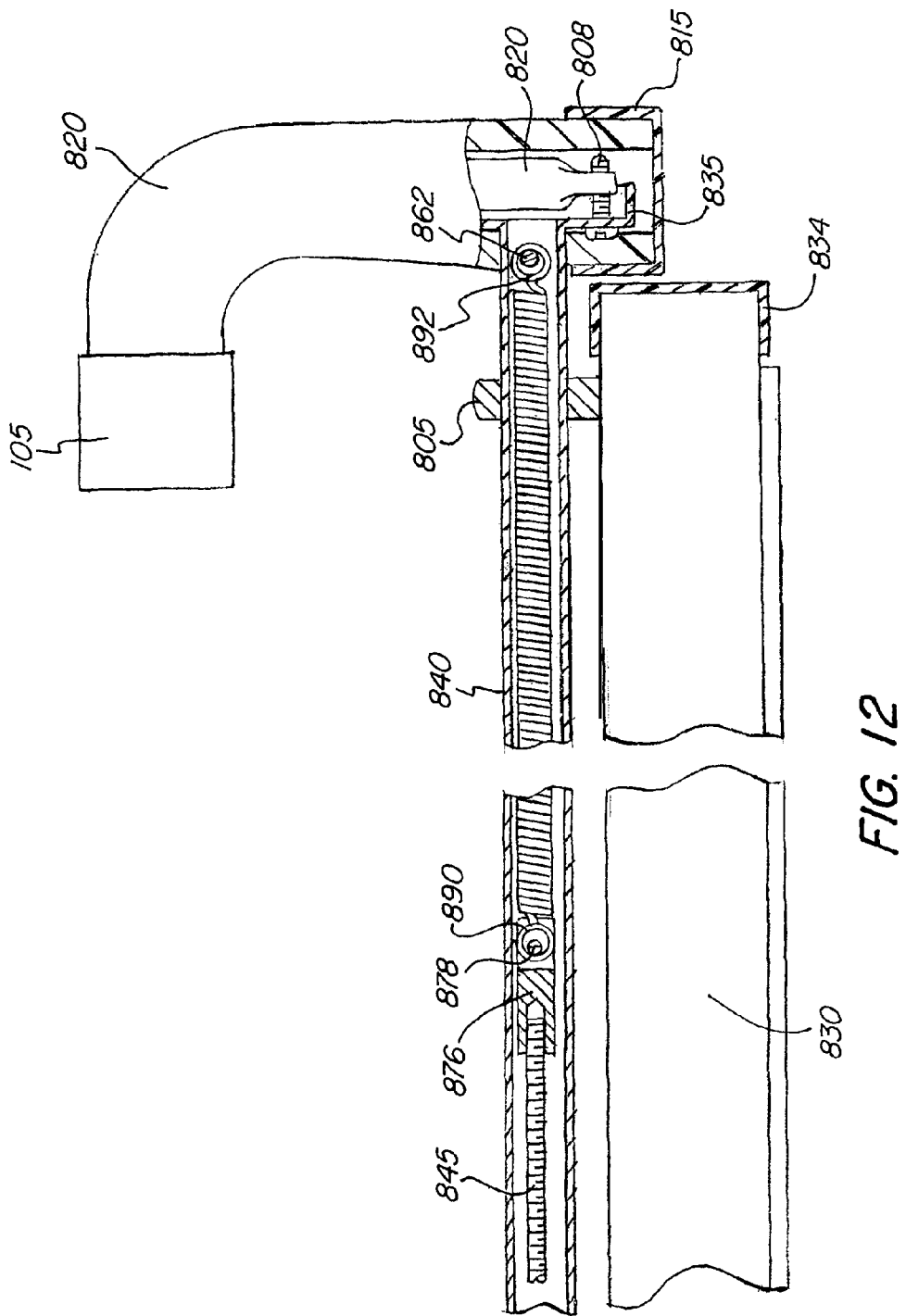
FIG. 12 is a cross section view of an exploded area of the lighting assembly of FIG. 8.

FIG. 12 provides a cross section view of the internal workings of the assembly of FIG. 8. Here, external stability rod 840 is shown attached to the light housing 830 via a bracket 865. End cap 834 is shown on the end of the light housing 830. This end cap can slide on and off the light housing 830, allowing for the fluorescent lights or other such lights located within the light housing 830 to be removed.

FIG. 12 also provides spring member 848 having its ring 892 attached through screw 862 to the internal stability rod 842. Ring 890 is shown attached through coupler assembly 876 to threaded extension 845. Furthermore, pin 876 is shown attaching the ring to the coupler 876.

FIG. 12 also provides internal end member 835 attached to internal clasping member 520 via a screw that goes through hole 808. Internal end member 832 is attached to internal clasping member 510 in a similar fashion (not shown).

Other embodiments of the invention further allow for different mechanisms for the spring member to attach to the clasping member.

FIGS. 13-17 show another embodiment of the invention having an internal support member.

Figure 13:
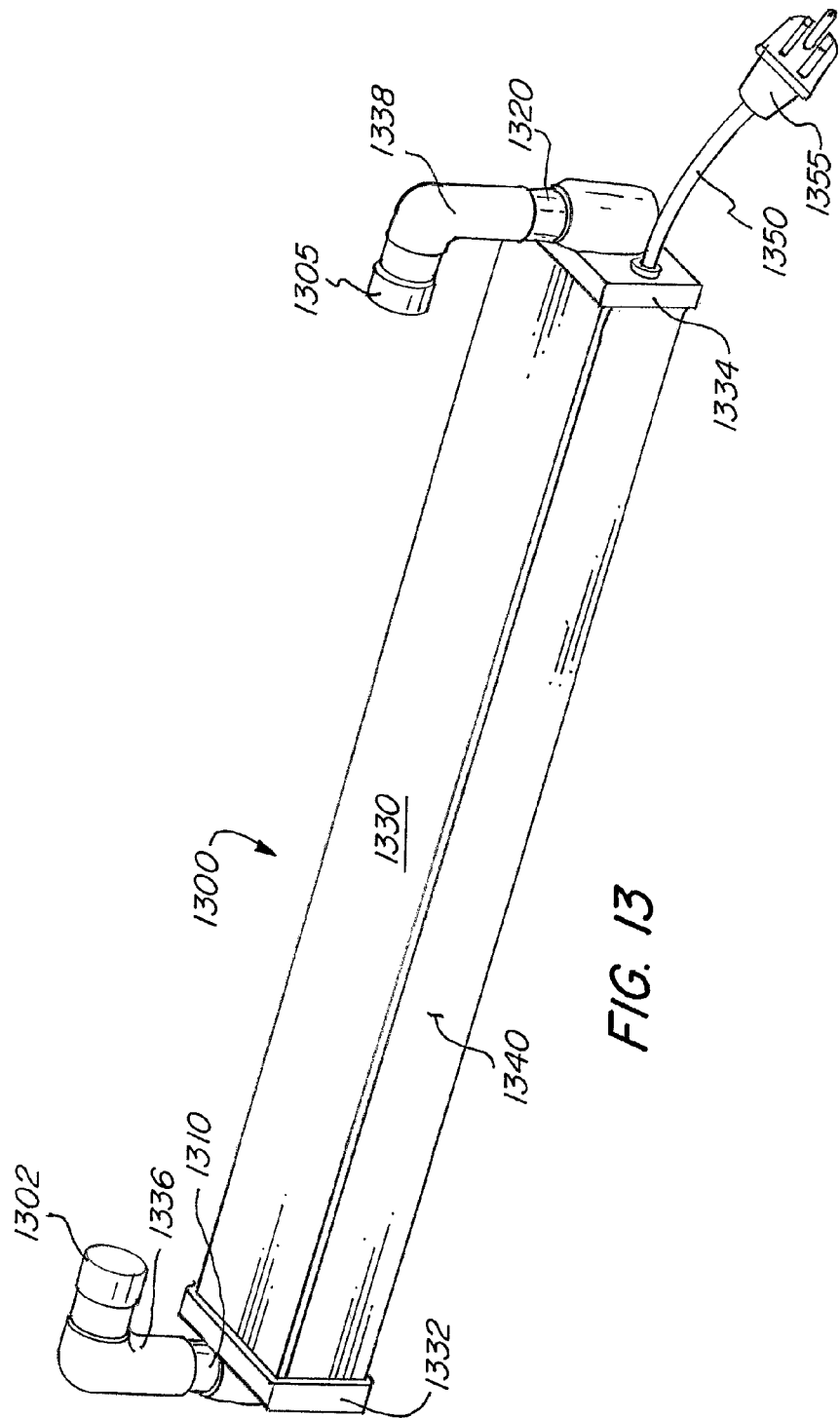
FIG. 13 is a perspective view of the lighting assembly of an embodiment of the present invention.

FIG. 13 shows light assembly 1300 having housing 1330 with front face 1340. Clasping members 1310 and 1320 are shown attached to housing 1330. Clasping members 1310 and 1320 have caps 1302 and 1305 respectively. End caps 1332 and 1334 are shown located at each end of housing 1330. Also shown in FIG. 13 is cord 1350 having conventional plug 1355.

Clasping members 1310 and 1320 have portions of rough material 1336 and 1338 respectively that allow for clasping members 1310 and 1320 to be secured to the hood of a vehicle, so that the assembly 1300 does not slide off a the hood of a vehicle.

Figure 14:
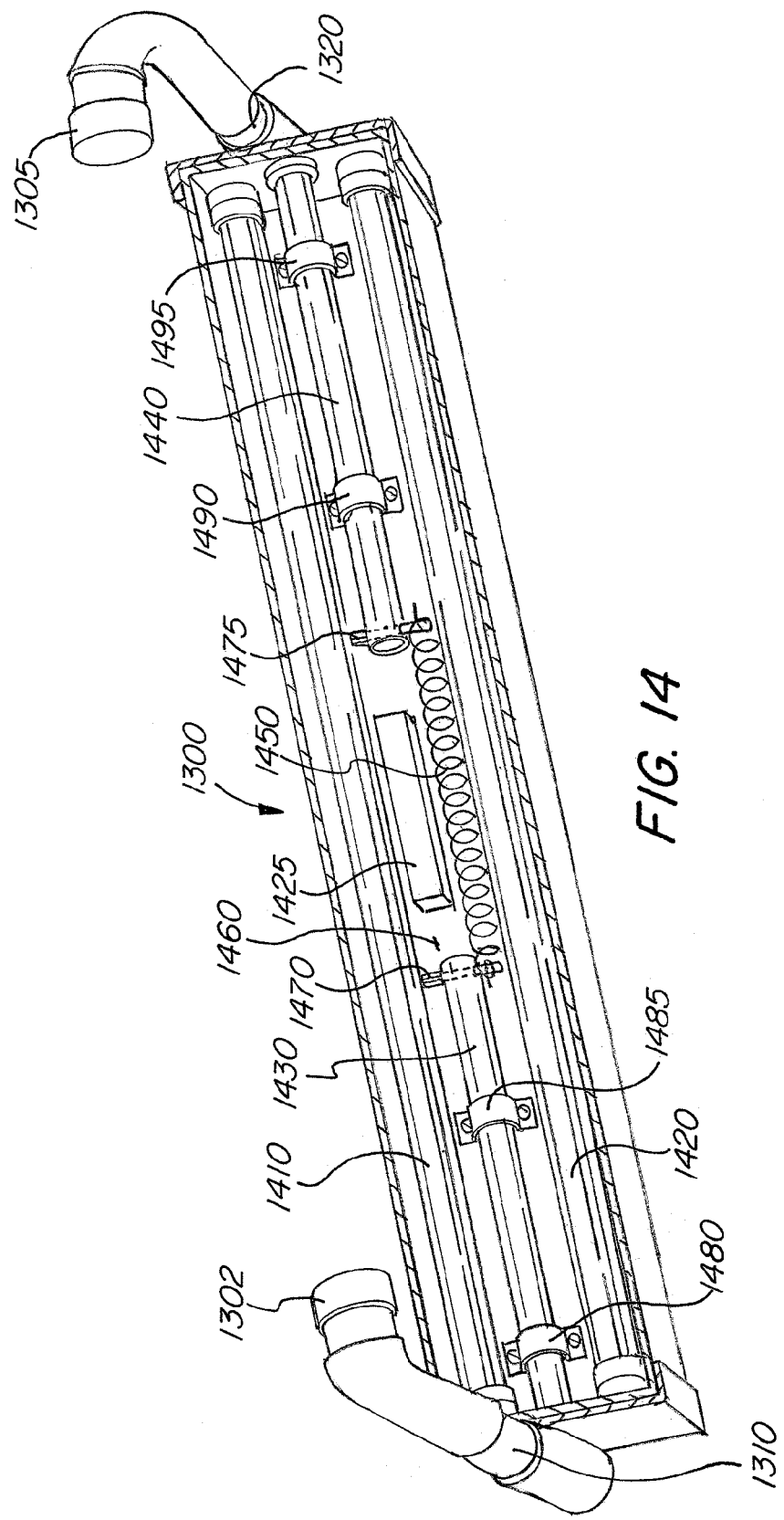
FIG. 14 is an internal view of the lighting assembly of FIG. 13.

FIG. 14 shows the internal workings of FIG. 13. Here, bulbs 1410 and 1420 are shown. In some embodiments, additional or fewer bulbs may be used. Also shown are first rod 1430 and second rod 1440. These rods are shown attached to the inner part 1460 of housing 1330 by brackets 1480, 1485, 1490 and 1495. In certain embodiments, more or fewer brackets may be used to attach the first rod 1430 and second rod 1440 to the inner part 1460 of housing 1300. In other embodiments, fasteners other than brackets may be used.

First rod 1430 and second rod 1440 are connected to one another by biasing member 1450. Biasing member 1450 is shown as a spring having ends connected to the ends of the first and second rods by fasteners 1470 and 1475. Fasteners 1470 and 1475 are located through holes in the ends of first rod 1430 and second rod 1440. Fasteners 1470 and 1475 attach to hooks at the ends of biasing member 1450. An internal circuitry element 1425 is also shown as well as clasping members 1310 and 1320 having end caps 1302 and 1305, respectively.

First rod 1430 and second rod 1440 are slidable within housing 1330. When clasping member 1310 is pulled, first rod 1430 slides, but biasing member 1450 provides tension upon the first rod 1430 that counteracts the sliding. When clasping member 1320 is pulled, second rod 1440 slides, but biasing member 1450 provides tension upon the second rod 1440 that counteracts the sliding. This tension allows for the assembly to attach to a hood of a vehicle.

Figure 15:
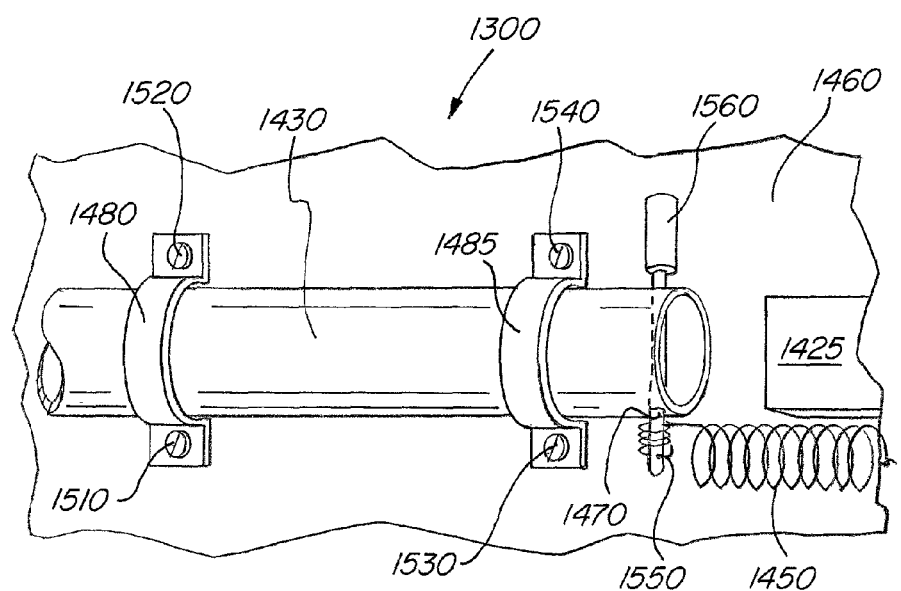
FIG. 15 is an exploded view of a subsection of the lighting assembly of FIG. 13.

FIG. 15 is an exploded view of the internal workings of the embodiment shown in FIG. 13. FIG. 15 shows first rod 1430 being attached to the inner portion 1460 of housing 1330 by brackets 1480 and 1485. Brackets 1480 and 1485 are attached to the inner portion 1460 of housing 1300 by fasteners 1510, 1520, 1530 and 1540.

First rod 1430 is slidable within the inner portion 1460 of housing 1300 and is attached to biasing member 1450. Biasing member 1450 is shown having a hook portion 1550 that attaches to the end of the first rod 1430 via a fastener 1470. Fastener 1470 is shown being located through holes in the end of first rod 1430. Fastener 1470 also interacts with hook 1550 to attach first rod 1430 to biasing member 1450.

Also shown is extended fastener 1560, which is located at the end of fastener 1470. Extended fastener 1560 prevents first rod 1430 from rotating about its axis as it interacts with inner portion 1460 of housing 1300, when first rod 1430 begins to rotate.

Second rod 1440 and biasing member interact though fastener 1475, which works equivalently to the interaction of fastener 1470 with hook 1550. Second rod 1440 also may have an extended fastener (not shown) that works equivalently to extended fastener 1560.

Figure 16:
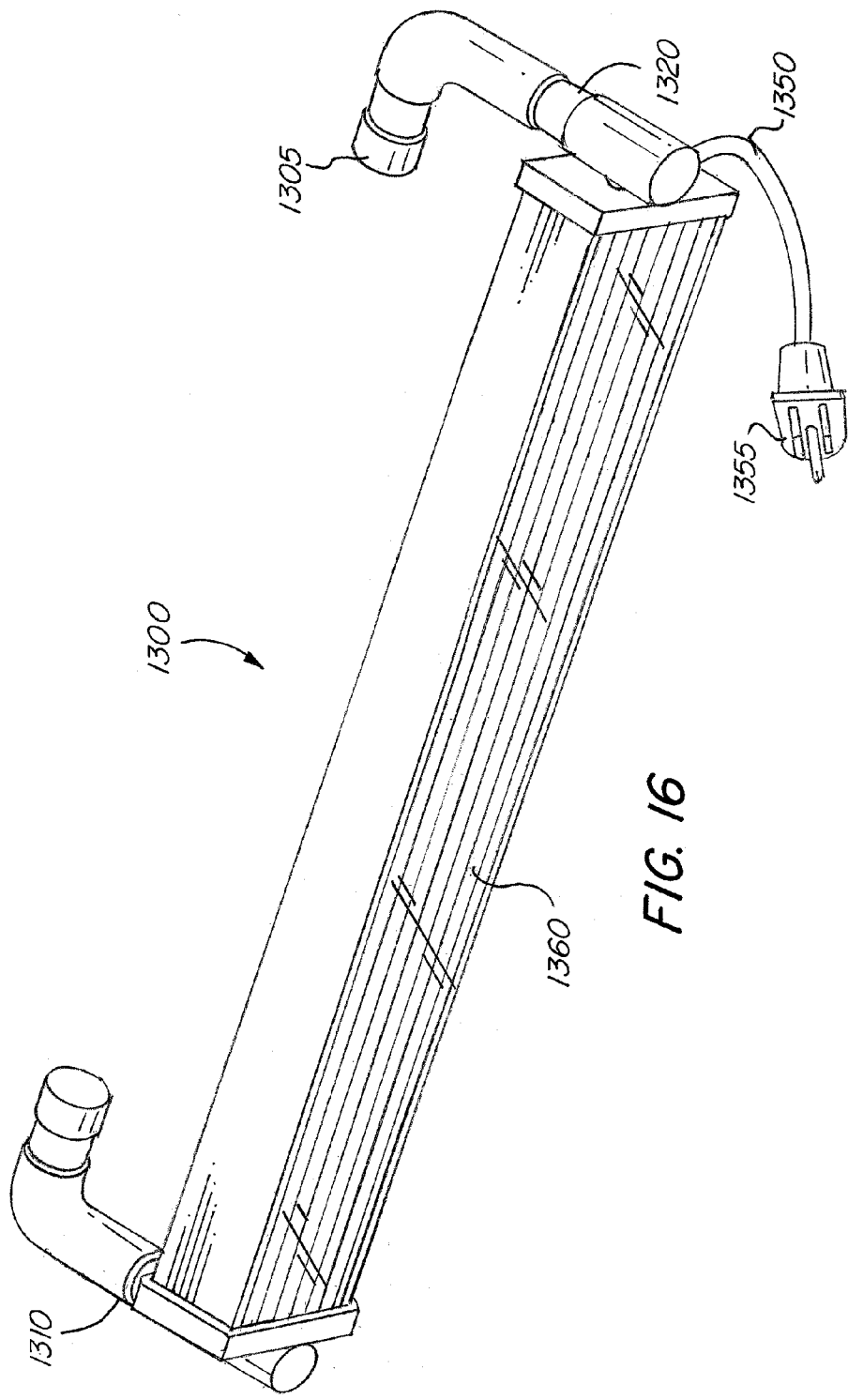
FIG. 16 is a rotated perspective view of the lighting assembly of FIG. 13.

FIG. 16 shows light assembly 1300 from the front side. Here, reflector 1360 is shown. Reflector 1360 allows light to pass through it and helps create a light with no shadows. Furthermore, FIG. 16 shows clasping member 1310 and 1320 as well as power chord 1350 having a conventional plug 1355.

Figure 17:
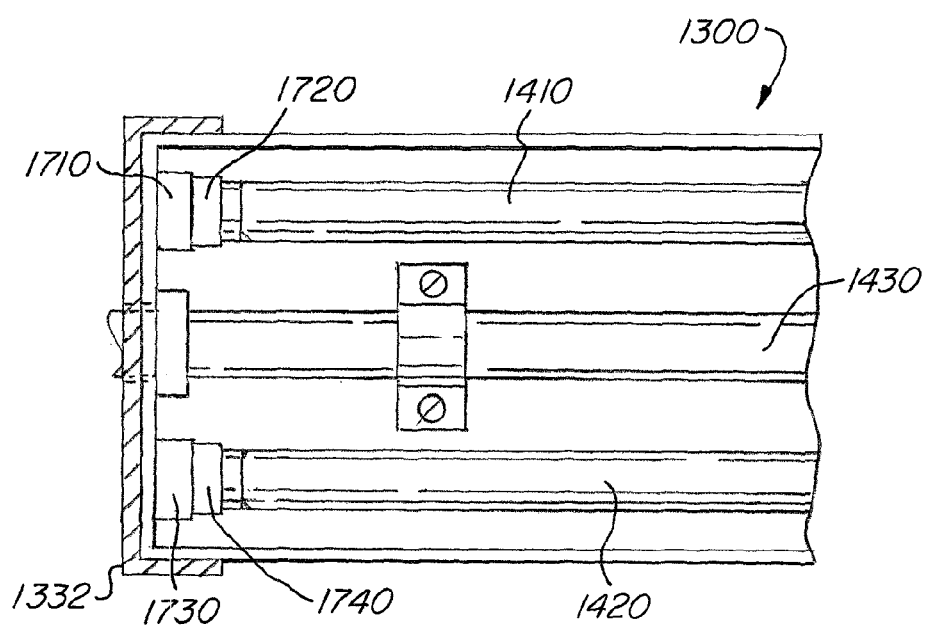
FIG. 17 is an exploded view of a subsection of the lighting assembly of FIG. 13.

FIG. 17 shows another internal view of FIG. 13. Here, bulbs 1410 and 1420 are shown with first rod 1430. Also shown are shock absorbers 1710 and 1730. These shock absorbers prevent the bulbs 1410 and 1420 from breaking if the assembly is dropped. Also shown are high temperature safety disks 1720 and 1740 for securing the light source to sockets if the light assembly is dropped. Such shock absorbers and high temperature safety disks are located at the sockets of the light assembly.

FIG. 18 shows another embodiment of the invention where floating member 1435 is shown, which is attached by brackets 1436 and 1436A with fasteners 1436B to the inner part 1460 of housing 1330.

Floating member 1435 has welded locking rods 1435AA attached it at its ends. First rod 1430 and second rod 1440 have notches 1431 and 1441 cut into them, which allow welded locking rods 1435AA to fit into the notches 1431 and 1441 when the clasping members are in the closed position. By moving one of the clasping members (discussed above), floating member 1435 will lock into the notches 1431 and 1441 to secure the floating member 1435 to first rod 1430 and second rod 1440 respectively. In the open position, the floating member 1435 is oriented so that welded locking rods 1435AA do not engage first rod 1430 and second rod 1440.

In the closed position, the notches and welding locking rod assembly allows a user to use one clasping member to control the other clasping member. FIG. 19 shows a cross section view of welded locking rod 1435AA. Such floating member 1435 can rotate so that welded locking rods 1435AA to fit into the notches 1431 and 1441.

FIG. 20 shows a close-up view of floating member 1435 in connection with other elements shown in FIG. 18. Floating member 1435 is shown being secured to body 1460 by bracket 1436. Notch 1431 is shown in first rod 1430. When first rod 1430 is rotated by rotating a clasping member, welded locking rod 1435AA interacts with notch 1431 to secure the floating member 1435 to the first rod. This helps lock first rod 1430 to floating member 1435 and then to second rod 1440, so that when a clasping member is rotated, a user is able to control the other clasping member. This helps mounting the assembly on the hood of a car and helps keep the assembly self-leveling.

In certain embodiments, floating member 1435 may consist of more than one floating member, such as 1435 and 1435A.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A lighting assembly comprising:
   a housing having a light source within the housing;
   a first support rod;
   a second support rod, the second support rod being located partially within the first support rod, wherein the second support rod and the first support rod are each attached to the light housing via one or more brackets; and
   two clasping members, one of the clasping members attached to an end of the first support rod and the other clasping member attached to an end of the second support rod,
   wherein the two clasping members attach the lighting assembly to a hood or body of a vehicle,
   wherein the lighting assembly is self-leveling,
   wherein the first support rod has a groove and the second support rod has fastener inserted within the second support rod,
   wherein when the fastener located within the second support rod is inserted within the groove located in the first support rod, the two clasping members rotate in unison for self-leveling the lighting assembly.

2. The lighting assembly of claim 1, further comprising a biasing member, the biasing member extending through both the first support rod and the second support rod.

3. The lighting assembly of claim 2, wherein the biasing member has a hook at each of its ends.

4. The lighting assembly of claim 3, wherein the biasing member comprises a spring and an extension member, the spring being able to adjust its length and the extension member being fixed in length.

5. The lighting assembly of claim 3, wherein each hook at the ends of the biasing member attaches to one of the two clasping members.

6. The lighting assembly of claim 5, wherein the first clasping member has an internal first clasping member and an external first clasping member and the second clasping member has an internal second clasping member and an external second clasping member,
   wherein the internal first clasping member is located within the external first clasping member and the internal second clasping member is located with the external second clasping member.

7. The lighting assembly of claim 6, wherein the hooks at the ends of the biasing member attach to the internal first clasping member and the internal second clasping member, the internal first clasping member and the internal second clasping member fitting within the hooks.

8. The lighting assembly of claim 7, further comprising two end members, the first end member being attached to an end of the first support rod and the second end member being attached to the end of the second support rod, wherein the first end member attaches to the internal first clasping member and the second end member attaches to the internal second clasping member via fasteners.

9. The lighting assembly of claim 1, wherein the light housing includes a mirror within the housing.

10. A lighting assembly comprising:
    a housing having a light source within the housing;
    a first support rod;
    a second support rod, the second support rod being located partially within the first support rod, wherein the second support rod and the first support rod are attached to the light housing;

a biasing member, the biasing member extending through the first support rod, wherein the biasing member has a hook at each of its ends;

a threaded extension element, the threaded extension element extending through the second support rod; and two clasping members, one of the clasping members attached to an end of the second support rod and the other clasping member attached to an end of the first support rod, wherein the two clasping members attach the lighting assembly to a hood or body of a vehicle, wherein the lighting assembly is self-leveling, wherein the first support rod has a groove and the second support rod has a fastener inserted within the second support rod, wherein when the fastener located within the second support rod is inserted within the groove located in the first support rod, the two clasping members rotate in unison for self-leveling the lighting assembly.

11. The lighting assembly of claim 10, wherein one hook at one end of the biasing member attaches to one of the two clasping members and the other hook attaches to a coupler assembly located at one end of the threaded extension element.

12. The lighting assembly of claim 11, wherein the threaded extension element attaches to the other one of the two clasping members via a nut and washer assembly.

13. The lighting assembly of claim 10, wherein the light housing includes a mirror.

14. A lighting assembly comprising:

a housing having a light source within the housing;

a first rod located within the housing, the first rod having two ends;

a second rod located within the housing, the second rod having two ends, wherein the second rod and the first rod are each attached to the light housing via one or more brackets;

a biasing member, one end of the biasing member connected to one end of the first rod and the other end of the biasing member connected to one end of the second rod;

two clasping members, one of the clasping members attached to the other end of the first rod and the other clasping member attached to the other end of the second rod, wherein the two clasping members attach the lighting assembly to a hood or body of a vehicle, wherein the first rod has a groove and the second rod has a fastener inserted within the second rod, wherein when the fastener located within the second rod is inserted within the groove located in the first rod, the two clasping members rotate in unison for self-leveling the lighting assembly.

15. The lighting assembly of claim 14, wherein the lighting assembly is self-leveling.

16. The lighting assembly of claim 14, wherein the biasing member is a spring.

17. The lighting assembly of claim 16, wherein the biasing member is under tension to urge the clasping members towards each other.

18. The lighting assembly of claim 16, wherein the biasing member has a hook at each of its ends, the hook at each of its ends being connected to one end of the first rod and to one end of the second rod via fasteners.

19. The lighting assembly of claim 18, further comprising an extended fastener located where the biasing member connects to one end of the first rod, the extended fastener keeping the first rod from rotating around its horizontal axis.

20. The lighting assembly of claim 18, further comprising an extended fastener located where the biasing member connects to one end of the second rod, the extended fastener keeping the second rod from rotating around its horizontal axis.

21. The lighting assembly of claim 16, wherein at least one of the two clasping members has a rough surface area, the rough surface area preventing the lighting assembly from sliding off a hood or a body of a vehicle when the lighting assembly is mounted on the hood or the body of a vehicle.

22. The lighting assembly of claim 16, wherein the housing includes a mirror, the mirror extending along the entire length of the housing.

* * * * *